June 3, 1930.  F. L. MAIN  1,761,928
WHEEL CONSTRUCTION
Filed Jan. 28, 1929  2 Sheets-Sheet 1

Inventor
Frank L. Main
By Blackmore, Spencer & Finch
Attorneys

Inventor
Frank L. Main

Patented June 3, 1930

1,761,928

UNITED STATES PATENT OFFICE

FRANK L. MAIN, OF JACKSON, MICHIGAN, ASSIGNOR TO GENERAL MOTORS CORPORATION, OF DETROIT, MICHIGAN, A CORPORATION OF DELAWARE

WHEEL CONSTRUCTION

Application filed January 28, 1929. Serial No. 335,558.

This invention relates to improvements in wheels and particularly to wheels for use on motor vehicles.

Most motor vehicles now being manufactured are equipped with 4-wheel brakes and each wheel as commonly constructed, consists of a series of radial spokes mounted on a hub and carrying a felloe at their outer ends on which is detachably secured a tire carrying rim, and to the inner side of which wheel is fastened a brake drum for the engagement of a frictional braking device operated by suitable mechanism, for checking wheel rotation.

It is an object of the present invention to simplify the construction of vehicle wheels and to provide a novel and improved wheel structure wherein the brake drum is an integral part of the wheel and is so arranged as to afford a wheel of great ruggedness with fewer parts and less material, whereby the construction of vehicle wheels is not only simplified but the ease and speed of assembly is greatly facilitated, and production costs materially reduced.

Figure 1:
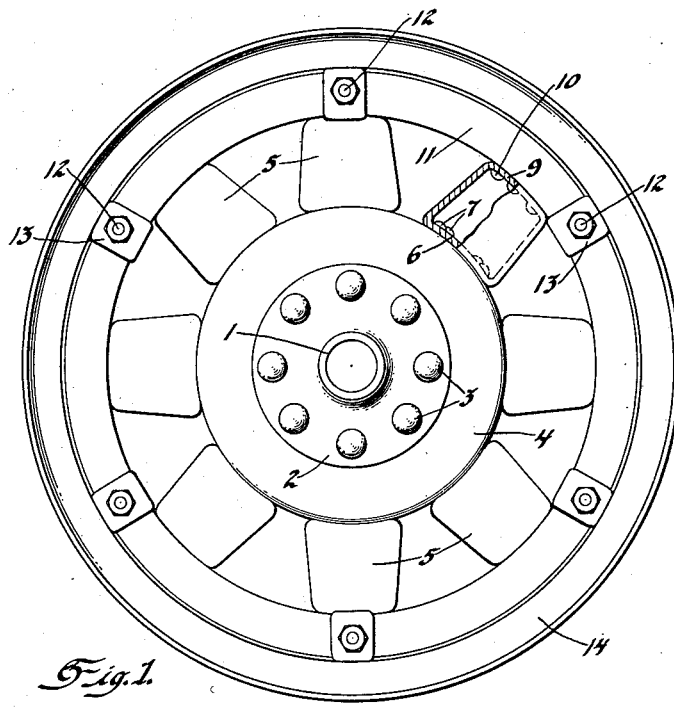
Figure 2:
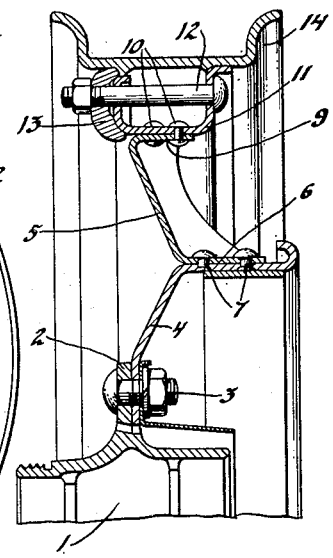
Figure 3:
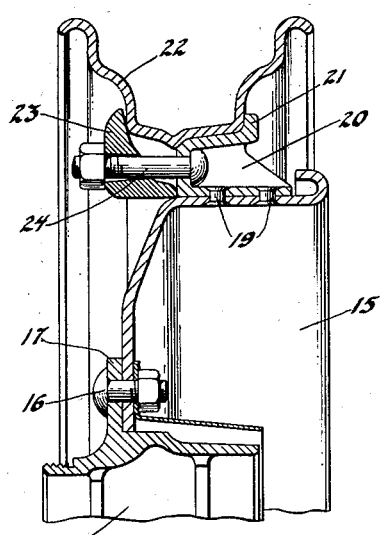
Figure 4:
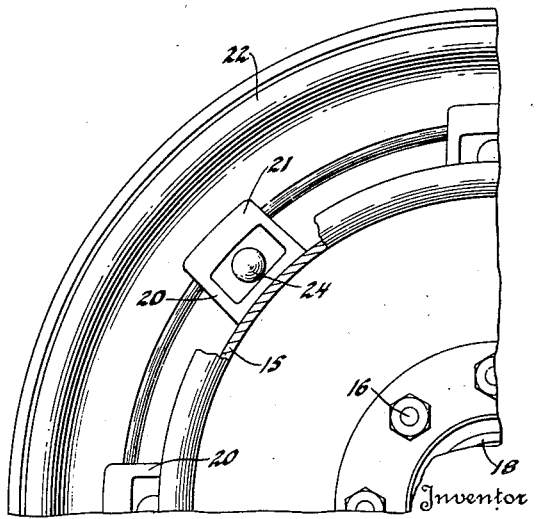
Figure 5:
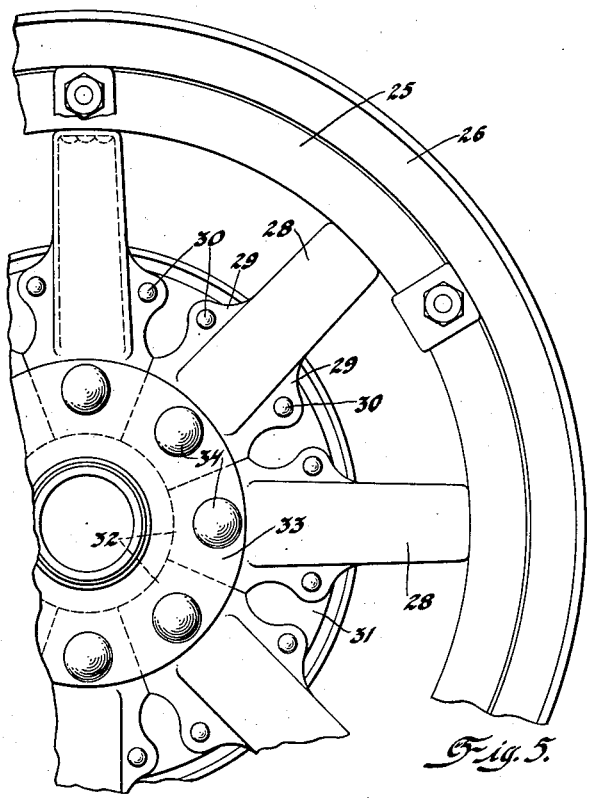
Figure 6:
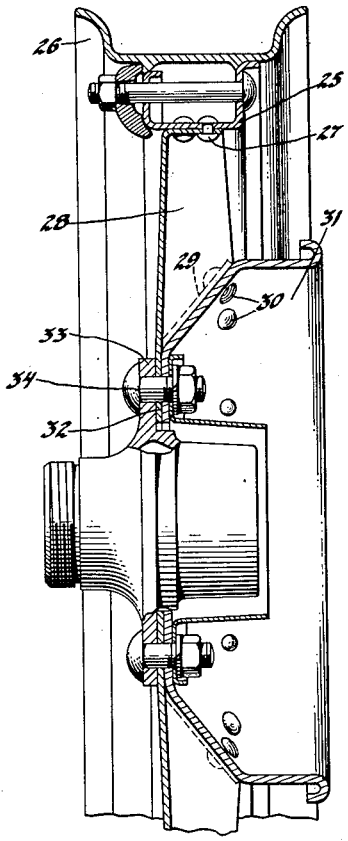
Figure 7:
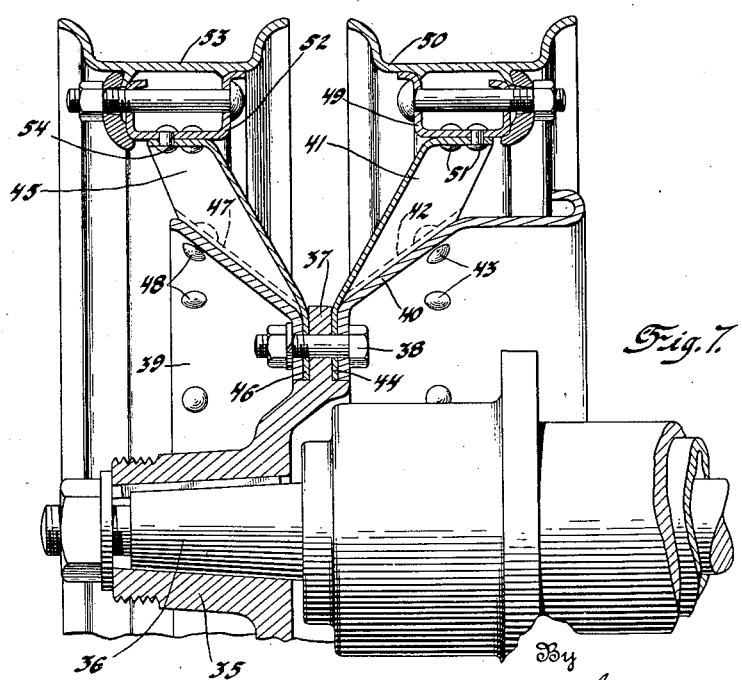

Various other objects of the present invention will be apparent from the following specification, when taken in connection with the accompanying drawing, wherein Fig. 1 is a side elevation of a vehicle wheel constructed in accordance with the present invention. Fig. 2 is a transverse sectional view of a portion of the wheel shown in Fig. 1. Fig. 3 is a transverse sectional view illustrating an alternative form of the invention. Fig. 4 is a fragmentary side elevation of the wheel shown in Fig. 3. Fig. 5 is a fragmentary side elevation of a modification. Fig. 6 is a transverse sectional view of the wheel shown in Fig. 5, and Fig. 7 is a transverse sectional view of another modification.

Referring to the drawing, the reference character 1 indicates a hub having an annular flange 2 to which is secured by a series of rivets or bolts 3, a brake drum 4 preferably pressed or formed from comparatively heavy gage stock. A series of short length spokes 5 which may also be of pressed metal, formed into channel shape in section, are each provided at their inner end with a flange 6 that is secured as by means of rivets 7 to the periphery of the brake drum 4 and the outer end of each spoke is provided with a flange 9 which may be secured by rivets 10 to the felloe or annular ring 11. The felloe, in this instance, is of rolled channel section and has a series of bolts 12 passing through the side flanges and carrying a retainer lug 13 for removably mounting on the felloe a tire rim 14. Thus it will be seen that instead of providing a series of long spokes between the rim and hub and a separate brake drum fastened thereto, there is provided according to the present invention, a series of short length, pressed metal spokes, to support the felloe directly on the brake drum, thereby affording a rugged wheel combined with an integral braking surface, of simple and economical construction.

In some instances, it may be found desirable to further shorten the length of the spokes and to practically mount the tire rim on the peripheral flange of the brake drum after the manner illustrated in Fig. 3, wherein the numeral 15 represents the brake drum secured by the bolts 16 to the flange 17 of the hub 18. Rivets 19 secure at spaced intervals on the periphery of the drum 15, a series of cast or stamped metal brackets 20, which brackets are provided with a tapered or inclined upper surface and a stop or shoulder 21 for engagement with one side of the tire rim 22, which may be, as shown, of the drop-center base type. A lug 23 secured by bolt 24 to each bracket 20 engages with the opposite side of the rim to detachably clamp the rim on the wheel thus provided.

For heavy duty usage, it may be preferable to construct the wheel as shown in Figs. 5 and 6, in which case the felloe 25 carrying the tire rim 26 is secured as by rivets 27 to the outer ends of a series of spokes 28. The spokes 28 are preferably of pressed metal and channel shape in section, and adjacent at their inner ends are provided on each side with radially extending flanges 29 that are secured by rivets 30 to the inclined side wall of the brake drum 31. At their inner ends a flattened extension 32 is secured between the brake drum 31 and hub flange 33 by the fastening bolt 34.

Where dual wheels are to be employed, the hub 35 mounted on the live axle 36, has secured to its annular flange 37 by bolts 38, the conical members 39 and 40, the member 40 being a brake drum. A series of spokes 41 provided with lateral flanges 42 are secured by rivets 43 to the brake drum 40 adjacent their inner ends, and have flattened extensions 44 at their inner ends held between the flange 37 and brake drum 40. A similar series of spokes 45 have their flattened end portions 46 clamped between the member 39 and flange 37 and are provided with lateral flanges 47 secured by rivets 48 to the member 39. A wheel felloe 49 on which is detachably mounted the rim 50 is secured as by rivets 51 on the outer ends of the series of spokes 41 and a similar felloe 52 carrying the rim 53 is secured by rivets 54 on the outer ends of the spokes 45. Here again the brake drum forms an essential part of the wheel and the felloe is mounted on the drum thru the medium of the pressed metal spokes.

Various modifications in the structure described may be made, such as would be apparent to those skilled in the art, without departing from the invention.

I claim:

1. A vehicle wheel including a hub having an annular flange, a brake drum secured to the flange, a series of radially extending pressed metal spokes of channel shape in section, fastened on said drum adjacent their inner end and having flattened extensions on their inner ends which are adapted to lie between the hub flange and the brake drum, and means on the outer ends of the spokes for carrying a tire rim.

2. A vehicle wheel including a hub having an annular flange, a brake drum fastened to the hub flange, a series of radially extending spokes of channel shape in section, carrying a felloe on their outer ends and secured adjacent their inner ends to the brake drum, and a flattened extension on the inner end of each spoke secured between the hub flange and the brake drum.

3. A vehicle wheel including a hub having an annular flange, a pair of conical members secured to said hub flange on opposite sides thereof, a series of channelled spokes having flattened portions on their inner ends secured between the hub flange and one of said conical members, a second series of channelled spokes having flattened inner end portions secured between the hub flange and the other of said conical members, and two felloes carried on the outer ends of the two series of spokes.

In testimony whereof I affix my signature.

FRANK L. MAIN.